Nov. 17, 1931.    C. LORENZEN    1,832,783
AIR SCREW
Filed June 13, 1927
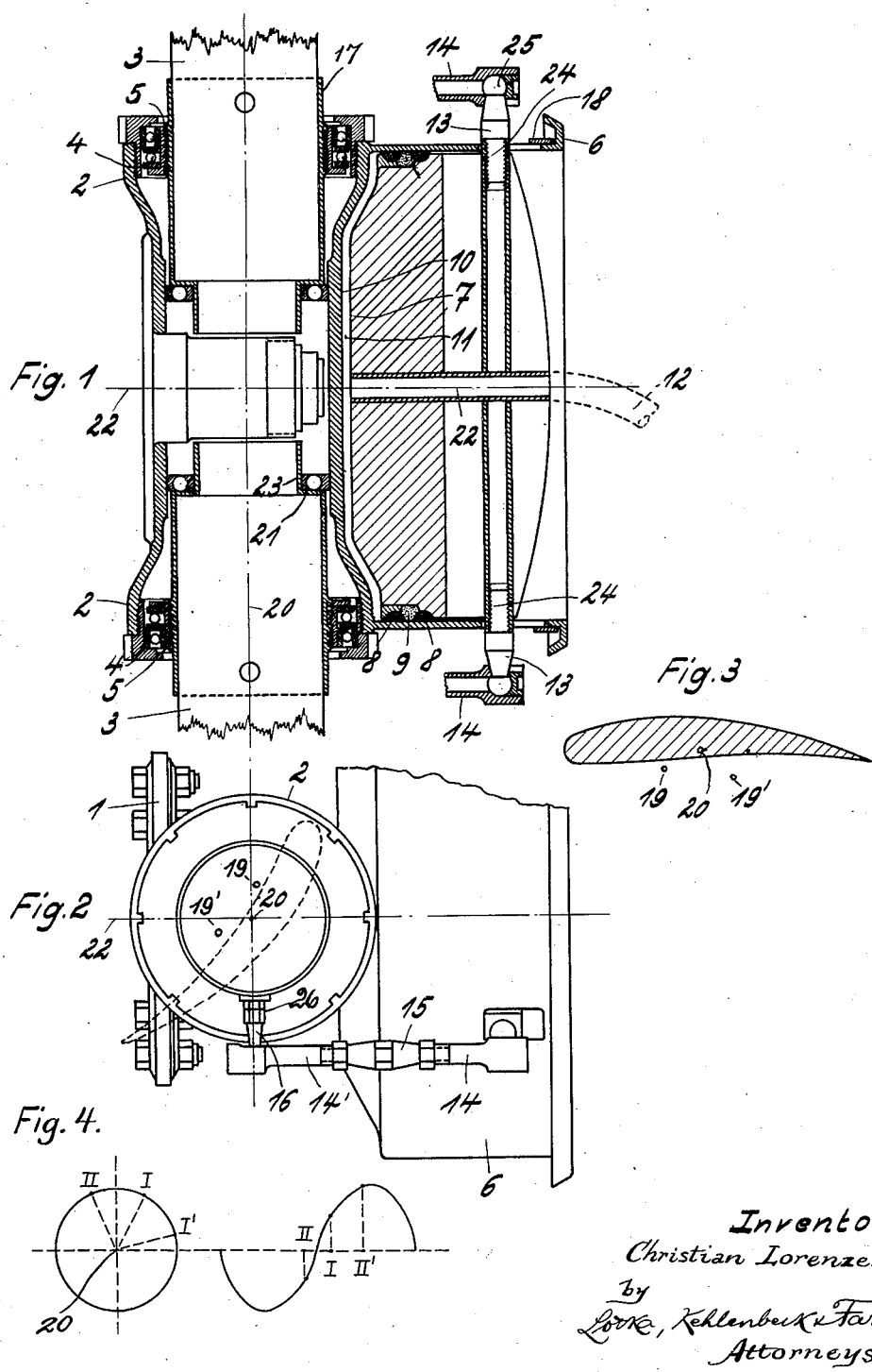
Inventor:
Christian Lorenzen
by
Locke, Kehlenbeck & Farley
Attorneys Patented Nov. 17, 1931

1,832,783

UNITED STATES PATENT OFFICE

CHRISTIAN LORENZEN, OF BERLIN, GERMANY, ASSIGNOR TO BENDIX AVIATION CORPORATION, OF CHICAGO, ILLINOIS, A CORPORATION OF DELAWARE

AIR SCREW

Application filed June 13, 1927, Serial No. 198,521, and in Germany June 16, 1926.

My present invention relates to screw propellers, particularly for aircraft, and has for its object to provide an improved construction of the type in which the pitch of the screw blades may be altered either automatically or at the operator's choice, if preferred. Among the advantages which I secure by the preferred form of my invention as illustrated by the accompanying drawings, I will here mention briefly the possibility of effecting an initial adjustment of the blade pitch, and furthermore provision for varying the diameter of the screw, and for enabling the operator to effect various adjustments without their interfering with each other. These and other objects and advantages will appear more fully from the description following hereinafter.

Reference is to be had to the accompanying drawings, in which Fig. 1 is an axial (vertical) section showing a satisfactory and preferred form of my invention, as an example; Fig. 2 is a partial top view, with the cross sectional shape of one of the blades indicated by dotted lines; Fig. 3 is a cross section through the blade, illustrating more clearly the location of the pressure centers of the air forces acting on the blade and the relation of such pressure centers to the axis about which the blade is turned to change its pitch; and Fig. 4 is a diagram illustrating certain relations referred to hereinafter.

The propeller or air screw is shown as having a hub 1 provided with as many sleeve-like projections 2 as there are blades, a two-blade propeller being illustrated. These sleeves, the axis 20 of which is radial with respect to the axis 22 about which the propeller hub 1 rotates, are provided with outer and inner bearings 4 and 21 respectively, for the inner portions or roots of the blades 3, each of which is adjustable in pitch by rocking it about said axis 20. Each bearing 4 comprises an outer member normally rigid with the hub structure 1, 2, an inner member connected with the respective blade 3, and balls or like elements interposed between said members. The outer member is adapted to receive the centrifugal thrust of the rotating blade. The inner member of the bearing 4 is held to rotate with the responsive blade 3, or rather to rock therewith about the axis 20; provision is made, however, for adjusting the blades out or in, so as to vary the effective diameter of the screw propeller. For this purpose, the inner end of the blade is shown fitted within a socket 17 adapted to be moved in or out by rotating the inner member of the bearing 4, owing to the screw connection indicated at 5; under normal operating conditions, however, the said inner member and the socket 17 with the blade 3 will be rigid with each other. The socket 17 is made with an inward extension 23 in sliding engagement with the inner bearing 21, which always remains at the same distance from the axis of rotation 22. Said extension 23 is of sufficient length to remain in engagement with the bearing 21 throughout the range of inward or outward (radial) adjustment of the blade; Fig. 1 shows the blades in the innermost position to which they may be adjusted.

The rocking of the blades 3 about their axis 20, for the purpose of altering their pitch, is accomplished through the medium of mechanism including an expansible and contractible chamber or container, this feature of my invention, in the embodiment illustrated, being of the same general type as in Letters Patent of the United States No. 1,555,422 issued to me September 29, 1925. In Figs. 1 and 2, I have shown a container 6 connected rigidly with the hub structure 1, 2 and therefore rotating in unison therewith. Toward the blades, said container is closed by an end wall 10; at its other end, said container is open to the surrounding air, and within the container 6 a piston 7 is movable toward and from the end wall 10, in a direction parallel to the axis 22, so as to vary the volume of the chamber 11 which is formed between the container 6, its end wall 10, and the piston 7. In order to secure a tight fit, the piston is provided with packing rings 8, and the chamber 9 between said rings may be filled with heavy grease or the like. The chamber 11 is filled with air or other suitable fluid. It will be understood that one face of the piston 7 is in contact with the trapped or imprisoned body of air or other fluid in the chamber 11, whereas the opposite face of the piston is exposed to the pressure of the surrounding air. Of course, as the craft ascends or descends in the atmosphere, this pressure acting on the outer or exposed face of the piston will decrease or increase, and the difference between the pressures acting on opposite faces of the piston will produce automatically a movement of the piston lengthwise of the propeller axis 22, toward the wall 10 when the craft descends, and away from the wall 10 when the craft rises, the volume of the chamber 11 varying according to such piston movement. It is also possible for the operator, at his choice, to vary the amount of air or other fluid imprisoned in the chamber 11, by injecting or withdrawing fluid through a pipe 12 indicated by dotted lines in Fig. 1, said pipe having a portion (indicated in section) which extends through the piston 7 and to the chamber 11. Preferably this pipe, or at least a portion thereof, is supported or constructed in such a manner as not to rotate with the piston 7 and the propeller. The pilot may simply blow or suck air through the pipe 12 with his mouth, or the outer end of said pipe may be made to communicate with a pump (not shown) located in the cockpit or at some other suitable point. Thus the pressure within the chamber 11, or the volume of air trapped therein, may be increased or decreased as desired, thus altering the position which the piston 7 will take under the normal atmospheric pressure of 29.922 inches.

The following mechanism or operative connection is provided to transmit the movement of the piston 7 to the blades 3 to alter the pitch of these blades by rocking them on their axis 20: With said piston are connected rigidly arms or brackets 13, preferably adjustable toward and from the axis of rotation, as by means of a screw connection 24 for each bracket, so that by turning the outer portion of each bracket about its individual axis (which is radial with respect to the axis 22), said outer portion will be adjusted inwardly or outwardly. These arms or brackets 13 extend through longitudinal slots in the side wall of the container 6, and slide in these slots whenever the piston 7 moves toward or from the end wall 10; Figs. 1 and 2 show the piston in the extreme position toward said wall 10. The outer ends or heads 25 of the adjustable portions of the arms or brackets 13 are preferably ball-shaped, and have a universal joint connection with corresponding sockets at the ends of connecting rods of variable length. For this purpose, said rods may be made in two sections 14 and 14' respectively, the adjacent ends of which are screw-threaded and engage corresponding threads in turnbuckles 15, by the rotation of which the connecting rods may be lengthened or shortened. The sections 14' of the connecting rods have a ball-and-socket connection of the same type as referred to above, with arms or brackets 16 connected to move in unison with the shanks of the respective blades 3. Preferably, the arms 16 are adjustable in length, that is, their ball-heads may be brought to different distances from the axis 20 about which the blade 3 rocks to vary its pitch; for instance, I have indicated at 26 a threaded connection between two sections of such arm 16, this connection being of the same character as the one shown at 24 in Fig. 1. I may thus adjust the leverage of the connecting rods 14, 14' tending to swing the blades 3 on their individual axes 20.

The various adjustment features set forth above enable me to meet all conditions arising in practice, when the screw is to be adapted to the characteristics of the particular engine employed, or to the thrust or speed it is desired to obtain. It may, for instance, be desired to keep the number of revolutions of the propeller constant and to alter the thrust or output of the screw automatically in response to variations in atmospheric pressure; in this case, the blades 3 would first be set at such an angle (pitch) as to obtain the desired result, with the engine running at its normal rotary speed; then, without changing the angle of the blades, the turnbuckles 15 are rotated in the proper direction to adjust the piston 7 lengthwise of the axis 22 until the chamber 11 has the required volume, that is, a volume such that the expansion of the gaseous fluid in the chamber 11 due to the lower density of the air at higher altitudes will take place in proper proportion to the pitch of the blades, which is varied by the movement of the piston 7 and the connecting rods 14, 14'. By screwing the arms or brackets 13 in or out, I may vary the distance between the ball heads 25 and the axis of rotation 22. Similarly, by means of the threaded connections at 26, I may lengthen or shorten the arms 16, that is, I may bring their ball-shaped outer ends nearer to, or farther from, the axis 20, and thus vary the leverage which the connecting rods 14, 14' exert on blades 3. Furthermore, I may also alter the output (power or thrust) of the air screw by rotating (manually or with a suitable wrench) the inner member of the bearing 4 while the other parts are stationary; such rotation will adjust the blade socket 17 and the blade 3 inwardly or outwardly, according to the direction of the rotation of said inner bearing member, thus decreasing or increasing the effective diameter of the air screw, without altering the pitch of the blades 3.

In order to give the blades 3 the proper initial position in the hub 1, I may employ any one or more of the adjustments described above which serve for varying the length of one or the other of the parts constituting the mechanism or operative connection for converting the motion of the actuating element (in this case, the piston 7), into the rocking adjustment of the blades 3 about the axis 20.

The diagram Fig. 4 illustrates in end view and in side view certain relations with reference to the pitch adjustment of the blades 3. The center of the circle in the end view represents the axis 20 about which the blade 3 is adjustable to alter its pitch, and the circle itself, or rather its circumference, represents the path described by the ball head of the arm 16 during its adjustment about said axis, the range of adjustment, or in other words, the angular distance between the two extreme positions which the arm 16 may take, being assumed as 45°. The stop 18 indicated in Fig. 1 may determine one of these extreme positions. The side view of the diagram is a sine curve illustrating the rate at which the angular adjustment takes place. Thus, if the initial position of the ball head of the arm 16 is at I, and its extreme position at I' (45° from I), the portion of the sine curve between the vertical lines I and I' exhibits a considerable degree of curvature; if however the initial position be chosen at II, and the extreme position at I, the portion of the sine curve between the vertical lines II and I will be practically a straight line; the range of adjustment from I to II will therefore be used in those cases in which the propeller screw is operated by an engine and speed ratio of which varies substantially according to a straight line, but if the engine varies according to some other definite curve, the range of adjustment of the arm 16 will be taken at such a portion of the sine curve as conforms most closely to the curve according to which the engine varies. In other words, the initial position of the ball head of the arm 16 may be selected in such a manner that when the blade pitch is adjusted during the operation of the propeller, the variation in pitch will be practically in direct ratio to the movement of the piston 7, or the said arm may be adjusted to such initial positions that a uniform movement of the piston 7 will cause the pitch of the blade to be varied in a progressively increasing or decreasing ratio.

By swinging the blades around through an angle of approximately 180°, the propeller screw, which originally functioned as a tractor screw, may be converted into a pusher screw, in which case, of course, the direction in which the propeller is caused to rotate will be reversed.

When an air screw rotates at varying speeds, the center through which the resultant of the air forces or pressures passes will alter its position, and this center of pressure therefore can not be made to coincide at all times with the axis 20 about which the blades 3 are adjusted to change their pitch. This shifting of the center of pressure is taken into account by giving the blades such a shape and by so locating the axis 20 that this axis will always remain between the limit points of the line or path through which the center of air forces moves as the rotary speed of the screw changes. In this manner a torque will be obtained which always tends to move the blades into a middle position, even if the adjustment mechanism is defective or has become damaged. Thus, Fig. 3 indicates at 19 the approximate location of the center of air pressure at low pitch, while at high pitch the center of pressure may shift, say to 19'. If the adjustment axis 20 is located at an intermediate point, as shown, there will be produced at low pitch, a force or torque tending to increase the pitch, while at high pitch there will be produced a force or torque tending to reduce the pitch. Should there be any leakage from the chamber 11 or from parts associated therewith, the shifting or creeping of the pressure center along the blades, occurring with different pitches, will counteract the adjustment forces in such a manner as to cause the pitch of the air screw to be increased if it is low at that time, and to be reduced if it happens to be high at the time of such leakage.

Various modifications may be made without departing from the nature of my invention as set forth in the appended claims.

I claim:

1. In combination with a screw having blades adjustable to vary their pitch, a container filled with a gaseous medium and having a wall movable to vary the effective interior volume of said container, and an operative connection for transmitting movement from said wall to said blades, said connection including arms secured to the movable wall and extensible in a direction transverse to the movement of said wall.

2. In combination with a screw having blades adustable to vary their pitch, a movable actuating member, and an operative connection for transmitting movement from said actuating member to the blades, said connection including arms secured to said member and extensible in a direction transverse to the movement of said member.

3. In combination with a screw having blades adustable to vary their pitch, a movable actuating member, transverse arms secured to said member and having outer portions adjustable in and out relatively to their inner portions, and an operative connection for transmitting movement from said adjustable outer portions to the respective blades.

4. In combination with a screw having blades mounted to swing, for adjustment of their pitch, about axes transverse to the axis about which the screw rotates, arms having inner sections attached to the respective blades, and outer sections connected adjustably with the said inner sections to move in or out relatively thereto, an actuating member, and an operative connection for transmitting movement from said member to the outer sections of said blade arms.

5. A screw propeller or the like, provided with an inner bearing and an outer bearing the axes of which align radially with respect to the propeller axis, and a blade the inner portion of which has a sliding fit within said inner bearing and is also adapted to turn therein, while another portion of said blade has a screw connection with said outer bearing, to permit the blade to be adjusted radially in or out by turning it about the axis of said bearings, to vary the effective diameter of the propeller.

In testimony whereof I have affixed my signature.

CHRISTIAN LORENZEN.